United States Patent

Taylor

[11] Patent Number: 5,720,817
[45] Date of Patent: Feb. 24, 1998

[54] RACK FOR SUPPORTING VEHICLE BODY PARTS DURING PAINTING

[76] Inventor: Richard Albert Taylor, No. 5 County Town Rd., Springfield, Ill. 62707

[21] Appl. No.: 630,997

[22] Filed: Apr. 12, 1996

[51] Int. Cl.⁶ ...................................... B05C 13/00
[52] U.S. Cl. .......................... 118/500; 269/17; 269/71
[58] Field of Search ................ 118/500; 269/17, 269/71, 905, 909

[56] References Cited

U.S. PATENT DOCUMENTS

| | | | |
|---|---|---|---|
| 1,603,595 | 10/1926 | Hansen | 118/500 |
| 2,036,459 | 4/1936 | Carter | 118/500 |
| 2,597,914 | 5/1952 | Whitworth et al. | 118/500 |
| 3,689,057 | 9/1972 | Webster | 269/17 |
| 4,180,252 | 12/1979 | Cushenbery | 269/17 |
| 4,183,511 | 1/1980 | Marek | 269/17 |
| 4,530,492 | 7/1985 | Bork | 269/17 |
| 4,838,199 | 6/1989 | Weber | 118/500 |
| 5,296,030 | 3/1994 | Young | 118/500 |

Primary Examiner—Laura Edwards
Attorney, Agent, or Firm—Edwin E. Greigg; Ronald E. Greigg

[57] ABSTRACT

A rack for supporting vehicle body parts during painting which includes a base frame, the base frame supports oppositely disposed side supports which are prevented from separating spacially by use of oppositely disposed end supports which are secured to the side supports. The side supports and end supports support attachments to which the body parts are secured for painting. The base, side supports, end supports and attachments are made of tubular steel round and square pipes. The square parts are held in a fixed directional position but may be adjusted along a line whereas the round parts may be rotated relative to each other for adjustment of position.

12 Claims, 13 Drawing Sheets

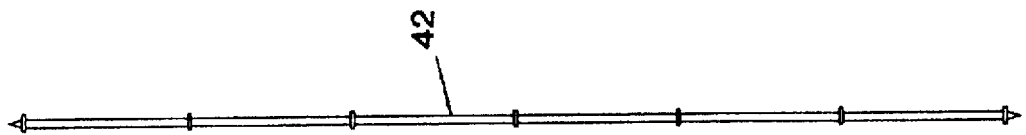
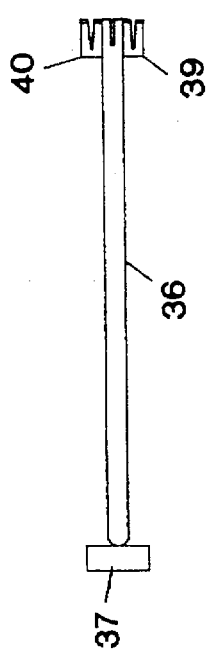
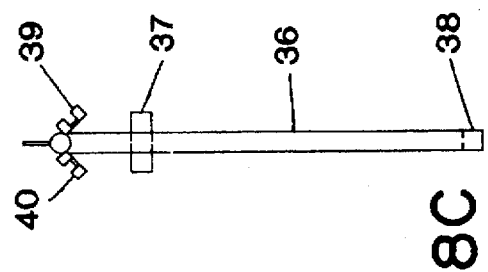
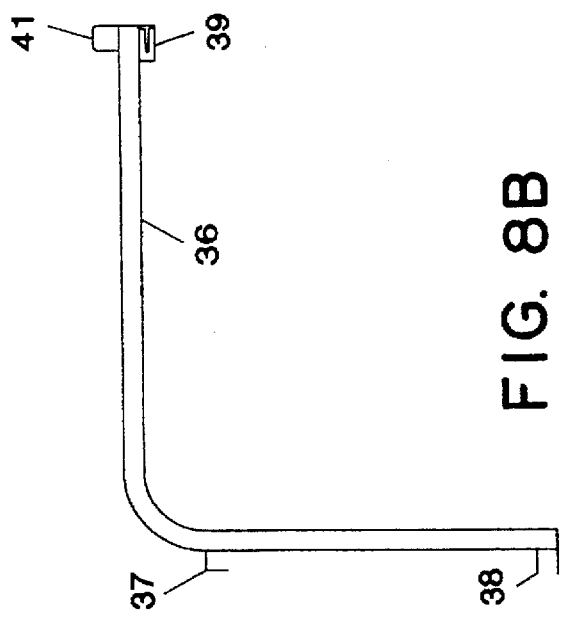

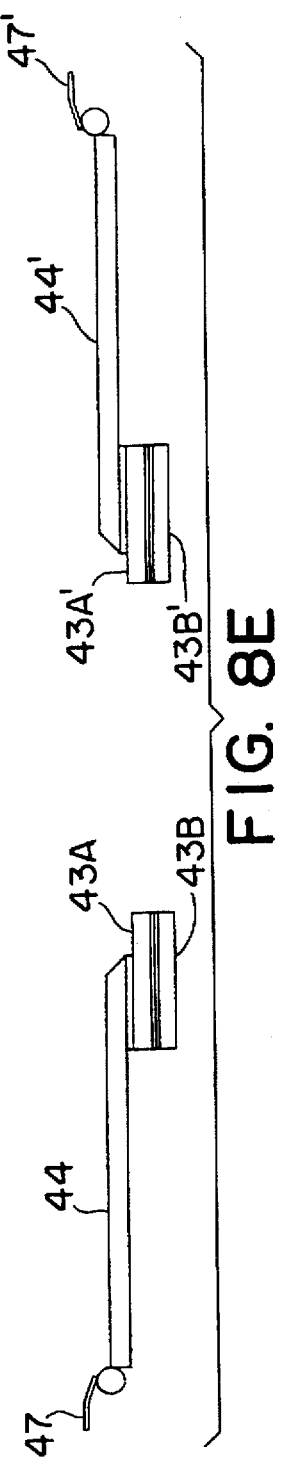

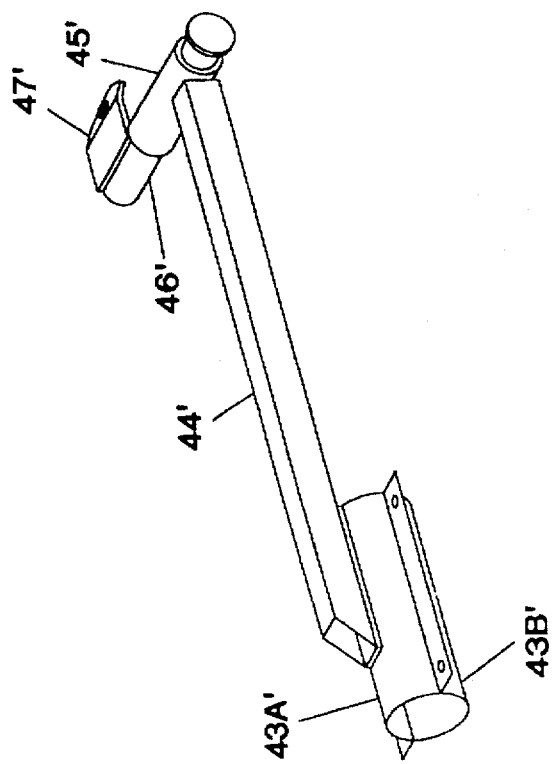
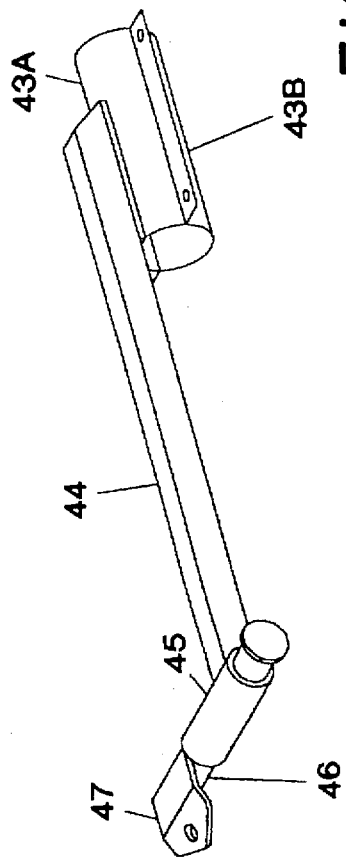
FIG. 8F

RACK FOR SUPPORTING VEHICLE BODY PARTS DURING PAINTING

This invention is directed to a rack which can be used for holding several automobile parts during painting. Not only are the parts held by the rack but they are held in a position which is substantially the same position as that when the part is on a vehicle.

BACKGROUND AND SUMMARY OF THE INVENTION

Occasionally automobiles are in an accident which requires body work to repair the parts and requires a rack upon which the various parts can be hung or fitted in order to paint the part after it has been repaired. Heretofore, various types of racks have been suggested, such as those in U.S. Pat. Nos. 1,603,595; 2,036,459; 2,597,914; 3,689,057; 4,530,492 and 5,296,030. These patents have their individual faults: they only hold a few of the parts; they could tip over during a paint job; and they do not position the parts in a position such as they would be positioned when they are on the vehicle. Such positioning of the vehicle parts allows one to paint the vehicle parts with a metallic paint wherein the paint will "lay" correctly so as to match with other previously painted or newly painted parts.

OBJECTS OF THE INVENTION

It is therefore a principal object of the invention to provide a rack for holding automobile parts during painting.

It is another object to provide a rack upon which parts can be assembled for painting where the parts are held in a position which duplicates the position in which the parts are assembled on a vehicle.

Yet another object is to provide an open type rack which will not tip over with parts placed thereon for painting and which allows space for a person to work during painting the parts.

Still another object is to provide a paint rack, the body part holding elements of which provide a stable mount for the parts, which eliminates any danger of the parts falling off during painting or in moving the cart to a storage area for drying and curing.

Even another object is to present a universal bumper rack which will adjust to firmly support any steel or rubber cover for a bumper without any worry of distortion during baking and which can be adjusted for painting the underside of the bumper.

In order that the invention may be more clearly understood, the accompanying diagrammatic drawings which show the manner of mounting different parts of a vehicle body.

BRIEF DESCRIPTION OF THE DRAWINGS

FIG. 6b is a side view of FIG. 6a;

FIG. 8a is a top view of the front hood support;

FIG. 8b is a side view of the front hood support;

FIG. 8c is a front end view of the front hood support, rotated 90° form the view shown in FIG. 8b;

FIG. 8d is a plan view of the hood support rod;

FIG. 8e is a perspective view of the left and right Rear Hood Hinge mounting structure 8c and 8d;

FIG. 8f illustrates the hood hinge supports;

DETAILED DESCRIPTION OF THE DRAWINGS

Figure 1:
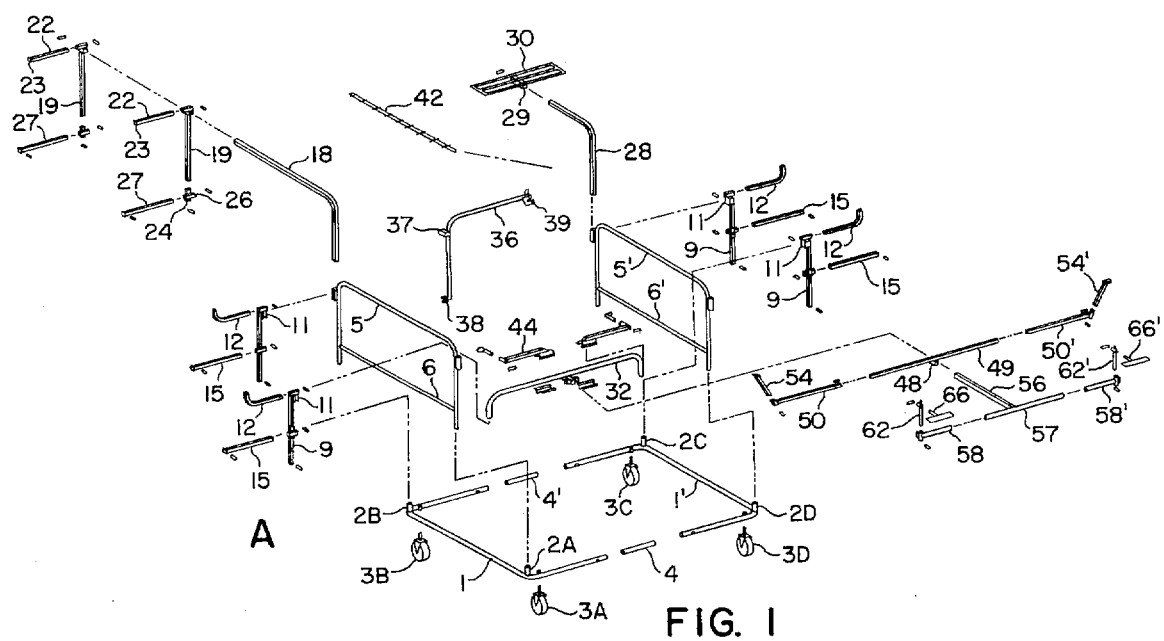
FIG. 1 is an "exploded" view of the Paint Cart "A" and all attachments or parts which are shown in separate drawings as indicated in FIG. 1.

Now referring to the drawings there is shown by example a rack for supporting different body parts of a vehicle during painting. As shown, the different parts are identified by different reference characters and the use of wording such as upward, downward, inward, outward, right, left, front and back in the description of the invention is in reference to position as they appear in the drawings and as a convenience to the reader.

FIG. 1 illustrates an exploded view of the overall rack in which the various parts of FIG. 1 have been identified by reference to different figures of the drawings. FIG. 1 illustrates the relationship of the different parts shown by reference to the singular drawing of the various parts.

Figure 2:
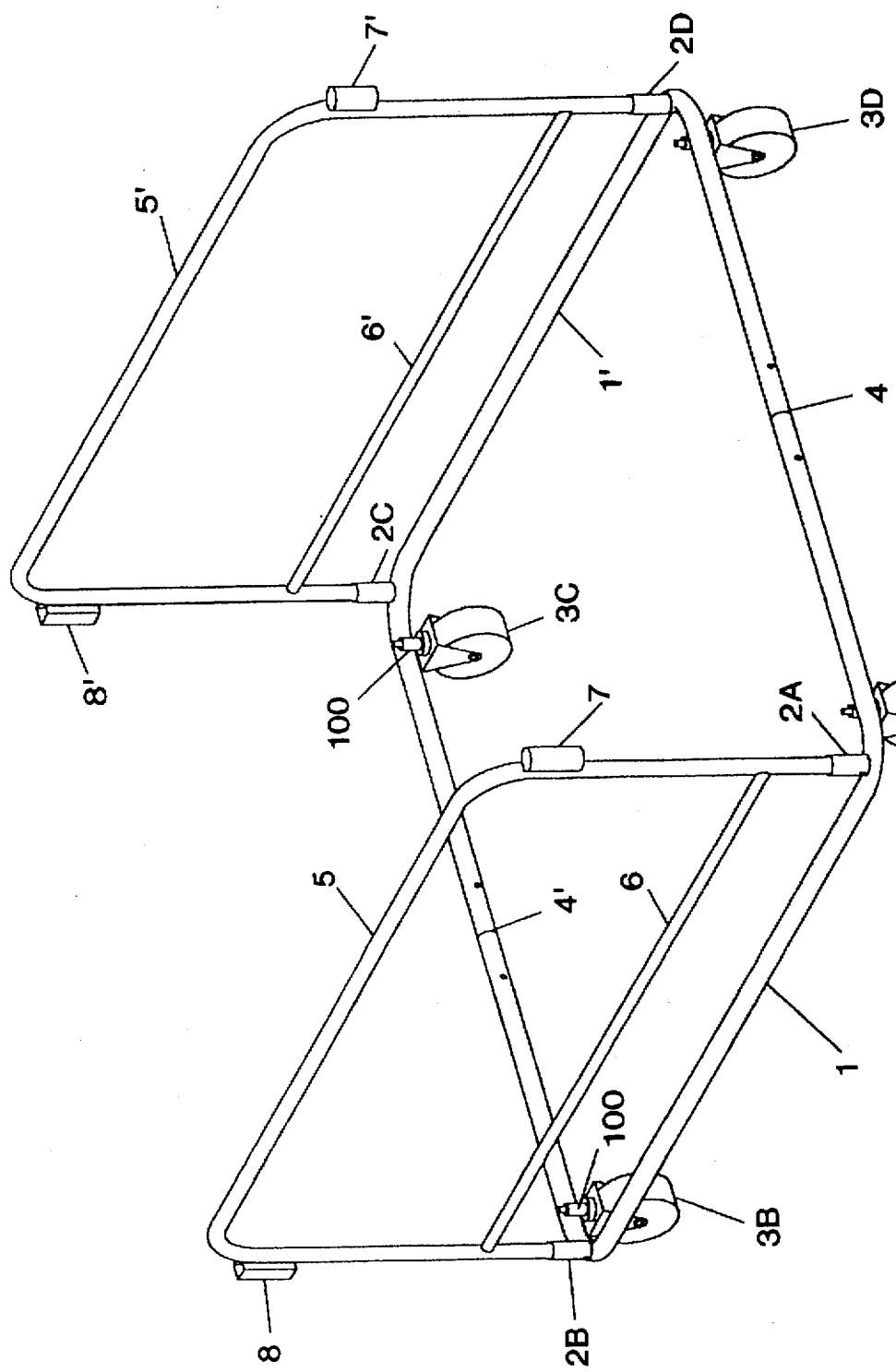
FIG. 2 is a perspective view of Paint Cart "A"

Referring to FIG. 2, the cart "A" is composed of two halves which are mirror images. The base is constructed of two sections of tubular steel, 1 and 1'. The two sections are formed in a "U" shape and have a horizontal bore drilled near the end of each side rail. The two sections of the base 1 and 1' are connected by two smaller diameter sections of steel tubing 4 and 4', which have a horizontal bore drilled in each end to which are attached machine bolts and locknuts, not clearly shown.

At each of the corners of the assembled base a section of steel tubing (2A–2D), of sufficient length to secure the side rails, is welded vertically upward from the base.

The base has sections of steel tubing 100 welded near each corner on the sides opposite the side rails, on the same sides to which sections 1 and 1' are connected and at a distance from the corner which allows the maximum stability from tipping the assembled cart. Caster rollers 3A–3D are attached to the base through these sections of tubing.

Side rails 5 and 5' are constructed of tubular steel which has been formed in a "U" shape. The size of the tubing and the shape of the "U" allow the side legs of rails 5 to fit inside the steel tubing 2A and 2B and the side legs of side rails 5' to fit inside the steel tubing 2C and 2D. Sections of steel tubing, 6 and 6' of a length equal to the distance between the side legs of side rails 5 and 5' are welded to the side legs of side rails 5 and 5' at a distance below the top of side rails 5 and 5' sufficient to enable the use of various attachments which will be explained subsequently.

Lengths of steel support tubing 7, 7', 8 and 8' are welded onto an outer surface of each end of side rails 5 and 5' at a point just below the bends in side rails 5 and 5' so that end supports 7 and 7' are mirror images and end supports 8 and 8' are mirror images. End supports 7 and 7' are round tubing while end supports 8 and 8' are square tubing. They are of sufficient length to support attachments which will be explained subsequently.

Figure 3:
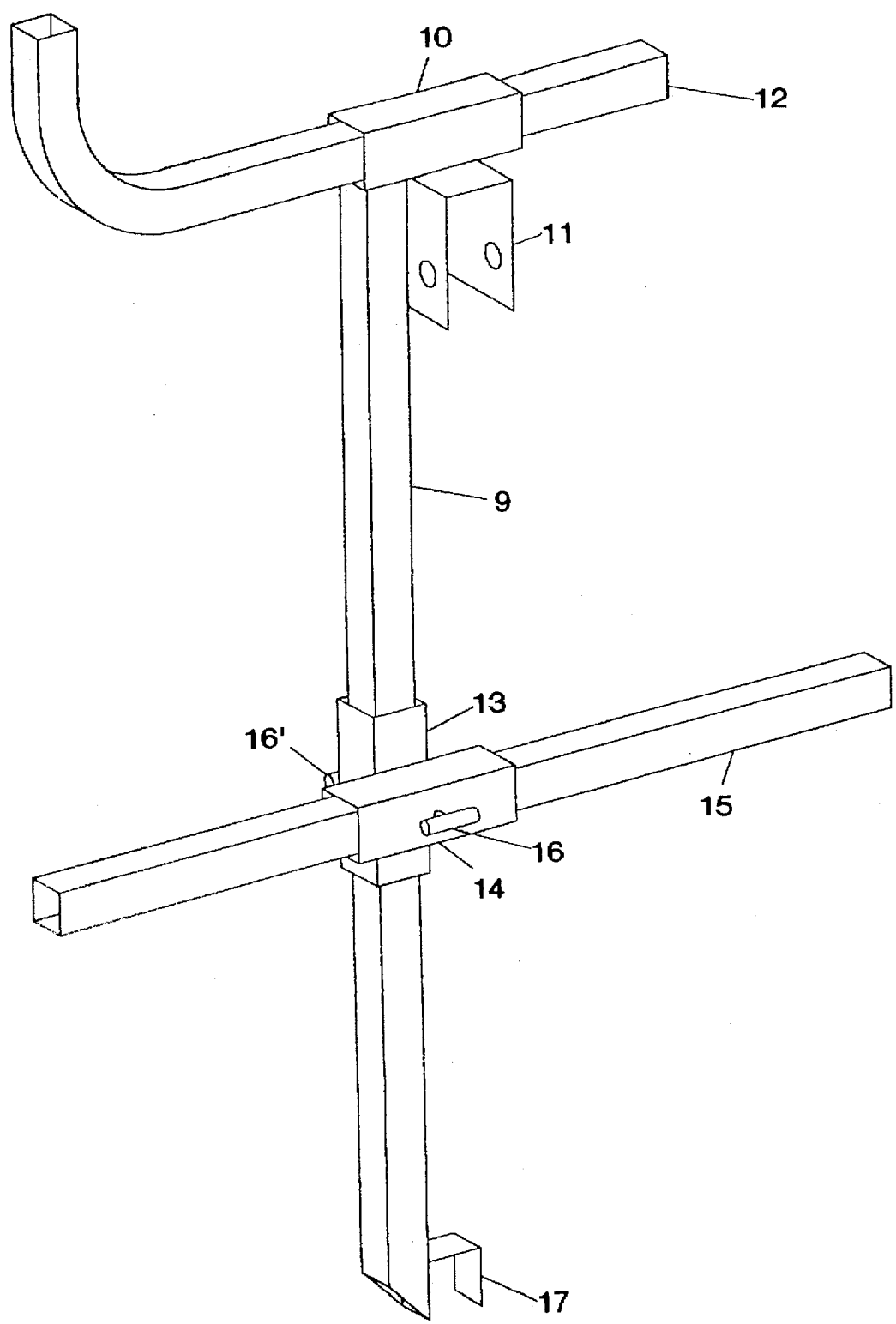
FIG. 3 is a perspective view of Fender Attachments B-1 through B-4 shown in FIG. 1.

FIG. 3 illustrates one attachment which has been shown in FIG. 1 as attachments B-1 through B-4 which are used primarily for hanging fenders, but may be used alternatively for doors. This attachment consists of a length of square steel tubing, 9, to which a second section of square steel tubing or sleeve 10, is welded. Tubing 10 is positioned on the top end and perpendicular to the end of tubing 9 so that any excess length of tubing 10 is towards the right of tubing 9. A section of U-shaped steel channel 11 is welded to the bottom of tubing 10 and to one side of tubing 9 and extends to the right side of tubing 9. It is positioned so the open side is facing downward, the bottom is up against tubing 10, and the side is centered on tubing 9. Steel channel 11 has a bore centered and near the bottom of the areas extending beyond the right side of tubing 9. A section of square steel tubing 12 has been formed in a "J" shape. It is of a size slightly smaller than tubing 10 so that square tubing 12 may be inserted into tubing 10 with the "J" end facing upward. After tubing 12 is inserted into tubing 10, roll pins, not shown, are positioned through the ends of tubing 12 so that the tubing cannot slip out of tubing 10.

Tubing or sleeves 13 and 14 are sections of square steel tubing. Tubing 13 is of a size slightly larger than tubing 9 and is slipped over tubing 9 from the bottom end. Tubing 14 is welded to tubing 13 in a position perpendicular to and centered on the right side of tubing 13. The center of the front side of tubing 14 and the center of the back side of tubing 13 have a threaded bore to which are fitted thumb screws 16 and 16'. A section of square steel tubing 15 is of a size slightly smaller than tubing 14 so that it may be inserted into tubing 14. After tubing 15 is inserted into tubing 14, roll pins, not shown, are positioned through both ends of tubing 15 so that it cannot slip out of tubing 14. After tubing 13 is positioned over tubing 9, a roll pin, not shown, is inserted through the bottom end of tubing 9 to prevent tubing 13 from sliding off of tubing 9.

The attachment is utilized by sliding the channel 11 over side rails 5 or 5' with the "J" portion of tubing 12 extending outward and upward. A bolt and locknut are inserted through the bore in channel 11 to secure it in place. Two of this type attachment are used per side, thus, two fenders may be hung on the cart at one time. Tubing 12 is adjustable in and out and is used to hang the fender while tubing 15 is adjustable in and out and up and down and can be locked with the thumb screws 16 and 16' to position the fender as it would be on the vehicle. With three to four points of contact the fender is very stable on the cart.

Figure 4:
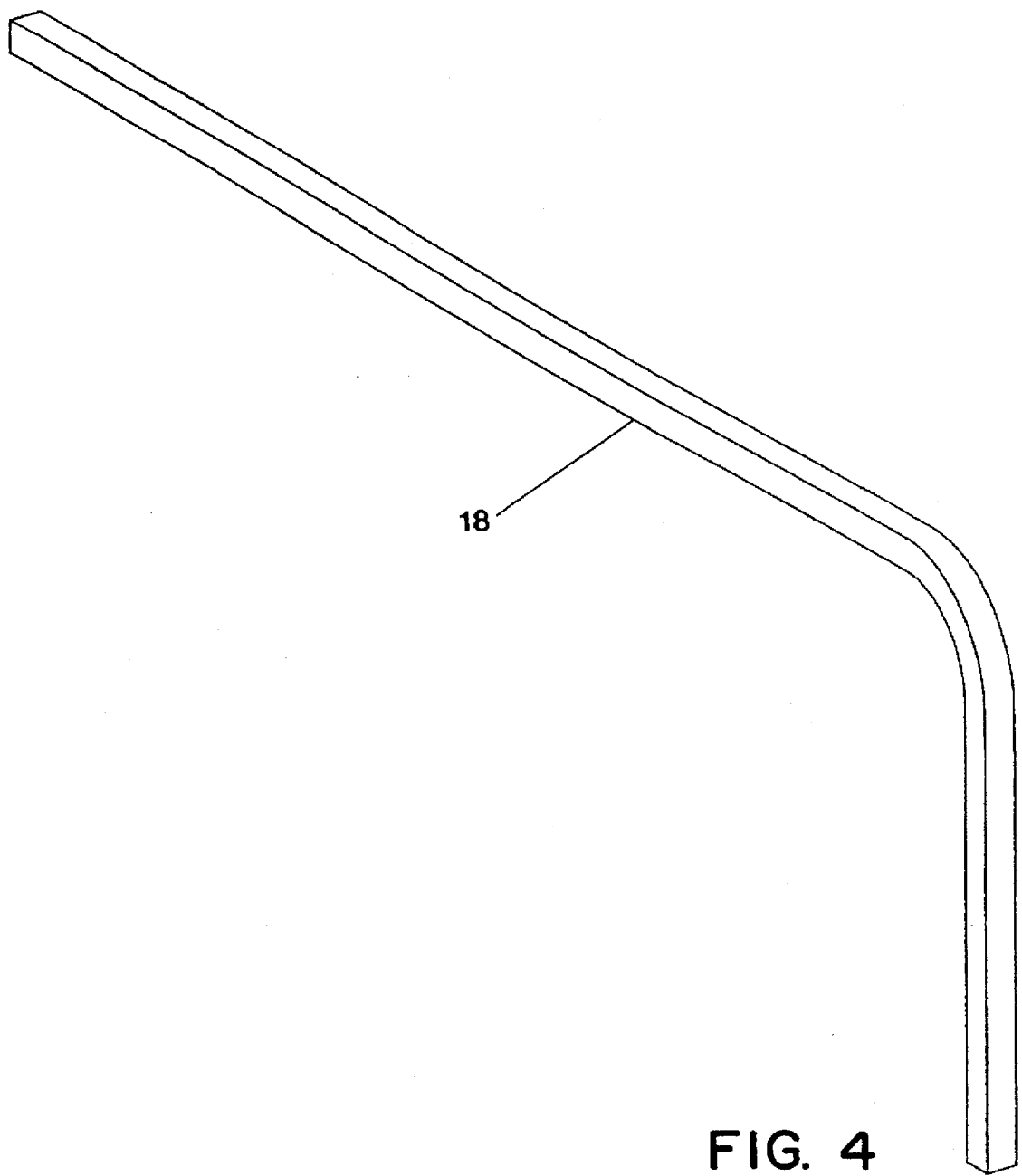
FIG. 4 is a perspective view of the Door Support Bar shown in FIG. 1.
Figure 5:
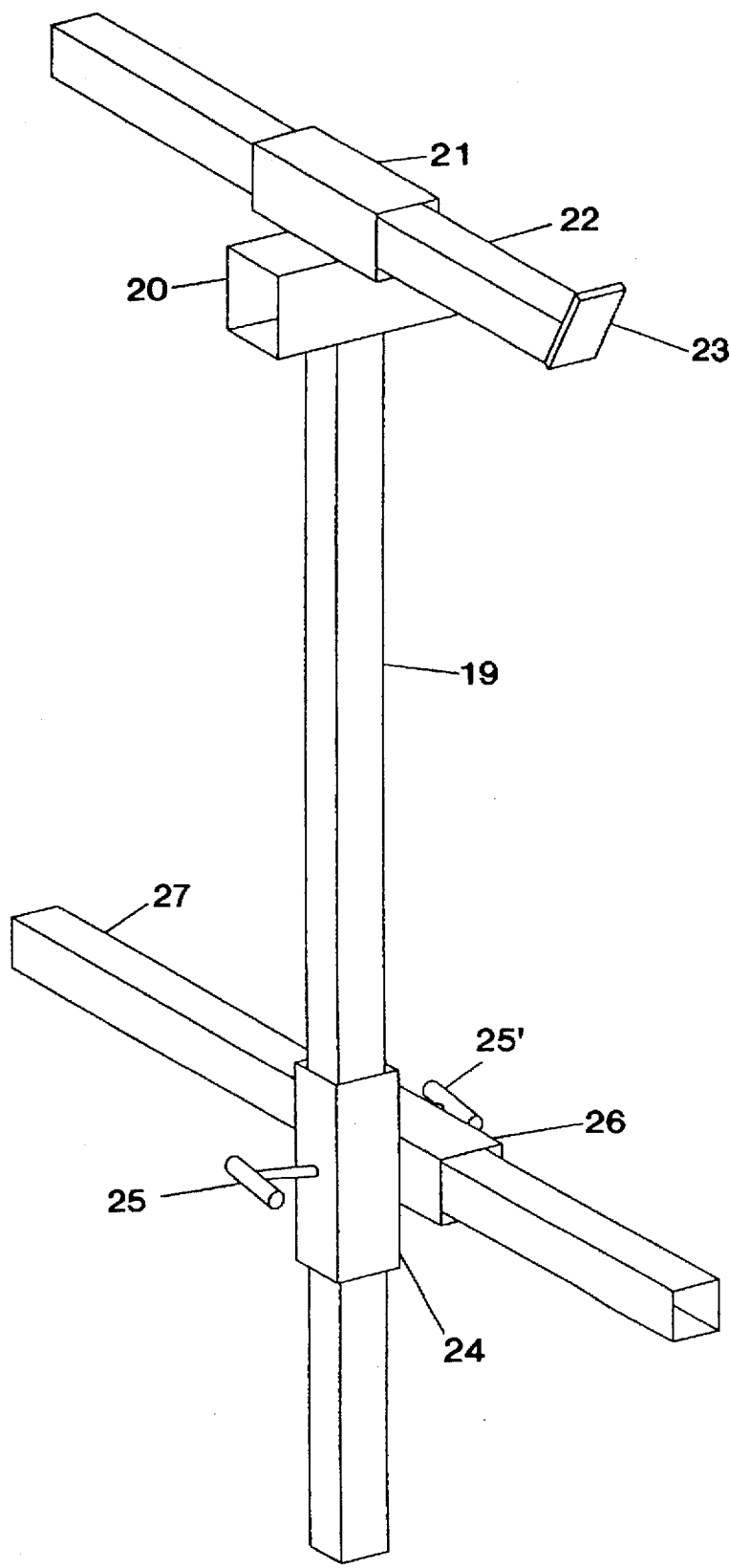
FIG. 5 is a perspective view of the Door Racks 5-A and 5-B shown in FIG. 1.

FIG. 4 is a perspective view of the door support bar, and FIG. 5 illustrates a door rack. These are used primarily for hanging doors, but may be used for other body parts.

The door support bar, 18, is formed of a length of square steel tubing which has been formed in an "L" shape. The size of the tubing is slightly smaller than the size of tubing 8 and 8' on FIG. 2 so that the shorter side of the "L" shape may be inserted into and supported by tubing 8 or 8'.

The door rack shown in FIG. 5 is formed by a length of square steel tubing, 19, to which a second section of square steel tubing or sleeve 20 is welded to the upper end. Tubing 20 is positioned on the top end and centered perpendicular to tubing 19. Tubing 20 is of a size slightly larger than the door support bar 18 so that the tubing 20 may be slid onto bar 18. A length of square steel tubing or sleeve 21 is welded perpendicular to tubing 20. It is positioned on top of and centered perpendicular to tubing 20. A length of square steel tubing 22 has a diameter slightly smaller than tubing 21 so that it may be inserted into tubing 21. The right end of tubing 22 is cut at an angle such that the bottom length is less than the top length. A piece of steel plate, 23, is welded to the angled end of tubing 22. The size of the steel plate 23 is such that it covers the end of tubing 22 and extends upward to form a lip at the top right end of tubing 22. After tubing 22 is inserted into tubing 21 a roll pin, not shown, is positioned through the left end of tubing 22 so that it cannot slip out of tubing 21.

Elements or sleeves 24 and 26 are sections of square steel tubing. Tubing 24 is of a diameter slightly larger than tubing 19 and is slipped over tubing 19 from the bottom end. Tubing 26 is welded to tubing 24 in a position perpendicular to and centered on the right side of tubing 24. The center of the left side of tubing 24 and the right side of tubing 26 have a threaded bore to which are fitted thumb screws, 25 and 25'. A section of square steel tubing 27 is of a size slightly smaller than tubing 26 so that it may be inserted into tubing 26. After tubing 27 is inserted into tubing 26, roll pins are positioned through the ends of tubing 27 so that it cannot slip out of tubing 26.

For hanging doors, the door support bar, 18, shown in FIG. 4, is inserted into tubing 8 or 8', shown in FIG. 2, with the longer side of the "L" shape extending rearward from the cart. Attachments 5A and 5B shown in FIGS. 1 and 5 are slid onto 18, utilizing the opening in tubing 20, with the lip of steel plate 23 extending outward from the cart. After attachments 5A and 5B are positioned on support bar 18, a roll pin, not shown, is inserted through the end of 18 so that attachments 5A and 5B cannot slide off of support bar 18. The lip of steel plate 23 on attachments 5A and 5B are used to hang the door. Tubing 24 can be slid up and down on tubing 19, while tubing 27 can be slid in or out to align the door in the same position as it would be on the vehicle. Tubing 24 and 27 are then locked in place with thumb screws, 25 and 25'. With three to four points of contact the door is very stable on the cart.

Figure 6C:
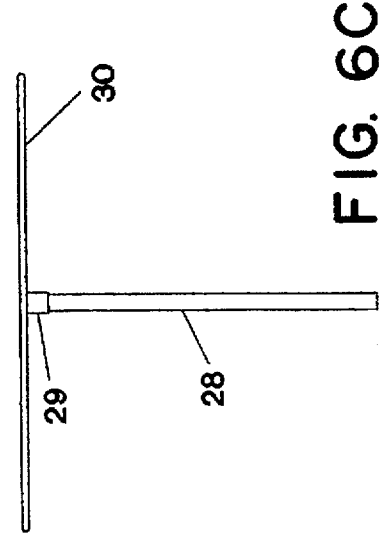
FIG. 6c is a front view of FIG. 6a, rotated 90° from the view of FIG. 6b.
Figure 6A:
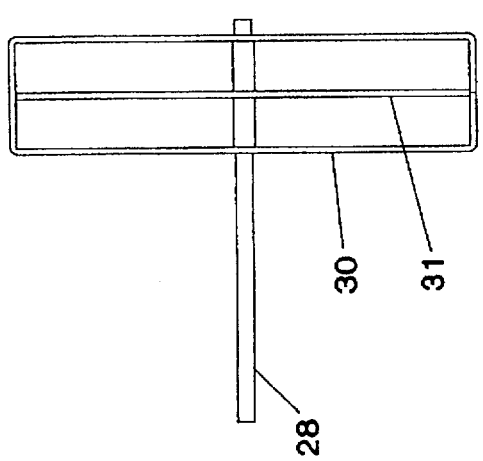
FIG. 6a is a top view of the Miscellaneous Parts Rack.
Figure 6B:
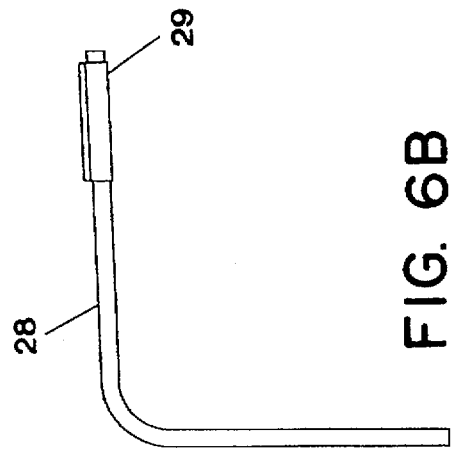

FIGS. 6a, 6b, and 6c, illustrate different views of a miscellaneous parts rack, which is used to hang any miscellaneous parts which need to be painted. It is of a length of square steel tubing, 28, which has been formed in an "L" shape. The size of the tubing is slightly smaller than the size of tubing 8 and 8' on the side rails shown in FIG. 2 so that the shorter side of the "L" shape may be inserted into and supported by tubing 8 or 8'. When inserted into tubing 8 or 8', the longer side of the "L" shape extends rearward from the cart. A section of square steel tubing or sleeve 29 is of a size slightly larger than tubing 28 so that it may slide over tubing 28. A section of steel rod 30 is formed in a rectangular shape, the ends of which are welded together to form a continuous rod. A section of steel rod 31 has the same diameter as rod 30 and is of a length equal to the distance between the shorter sides of rod 30. Rod 31 is welded to rod 30 on both ends with rod 31 being centered at both ends on the shorter sides of rod 30 and parallel to the longer sides of rod 30. The combination of rods 30–31 is centered on top of tubing 29, with the longer sides of rod 30 perpendicular to the top of tubing 29. The combination of rods 30–31 is welded to tubing 29 at all points where the combination rods 30–31 and tubing 29 have contact. Tubing 29 is inserted over 28 with combination 30–31 on top of tubing 29. After tubing 29 is inserted over tubing 28 a roll pin is inserted through the extended end of tubing 28 so that tubing 29 cannot slip off. This configuration yields a very stable base for painting miscellaneous body parts.

Figure 7:
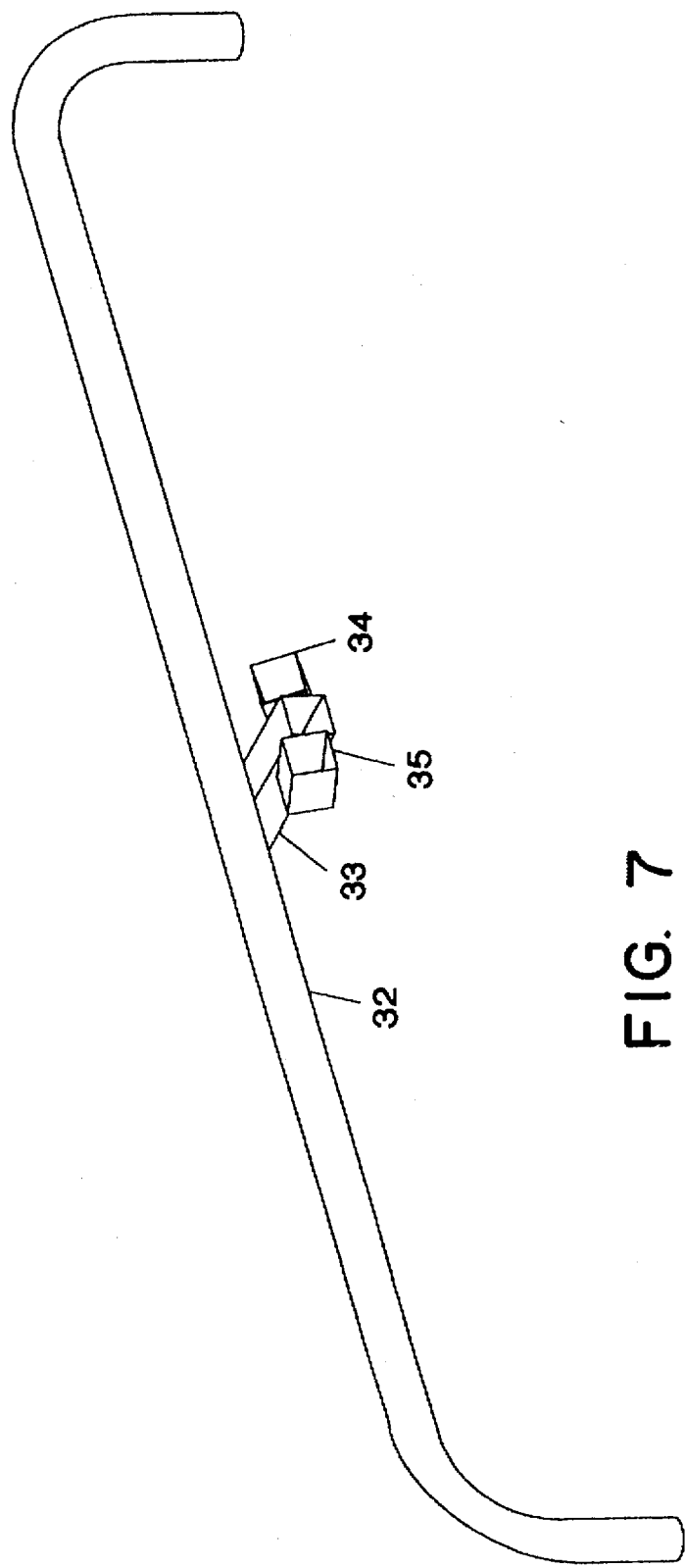
FIG. 7 is a perspective view of the Rear Crossbar shown in FIG. 1.

FIG. 7 illustrates a rear crossbar which is designed as a brace to stabilize the side rails 5 and 5' and as support for the rear hood hinges and the bumper rack. The rear hood hinges and bumper rack will be explained subsequently.

A section of round steel tubing 32 is formed in a "U" shape. The diameter of the tubing is of a size slightly smaller than the diameter of tubing 7 and 7', shown in FIG. 2, and the distance between the shorter sides of the "U" shape is equal to the distance between tubing 7 and 7' so that the ends of the sides of the "U" shape may be inserted into tubing 7 and 7'. The angle between the top or longer side of the "U" shape and the sides of the "U" shape is 90 degrees. When inserted in place the 90 degree bends allow for a "friction" fit between the ends of tubing 32 and tubing 7 and 7' giving the cart more side to side stability. A section of square steel tubing 33 is welded to the bottom and perpendicular to tubing 32 with tubing 33 extending from tubing 32. A section of square steel tubing or sleeve 34 is welded to the right side of tubing 33 with the open end of tubing 34 extending upward at an angle of 30 degrees from the opening of tubing 33. A section of square steel tubing or sleeve 35 is welded to the left side of tubing 33 with the open end of tubing 35 extending upward at an angle of 15 degrees from the opening of tubing 33.

FIGS. 8a–8d illustrate different views of a hood support system, formed of attachment 8-A front, hood support, attachment 8-B, front hood support rod, and attachments 8-C and 8-D, rear hood hinges. It is designed to accept hoods of various sizes, constructed with hinge bolt holes at various angles, and to allow the hood to be raised and lowered so that all surfaces of the hood may be painted.

Attachment 8-A, FIG. 8a, supports the front of the hood when it is in a horizontal position and supports the hood support rod, 8-B, FIG. 8d, when the hood is in any of the selectable raised positions.

Attachments 8-C and 8-D anchor the rear of the hood to the rear cross bar, FIG. 7, utilizing machine bolts and the hood's hinge-bolt holes.

Attachment 8A illustrates a length of steel tubing, 36, formed in an "L" shape. A section of steel channel 37 is welded to tubing 36 on the outside of the shorter side of the "L" shape and perpendicular to tubing 36, with the open side of the channel facing downward. A section of steel channel 38 is welded to tubing 36 on the bottom outside and perpendicular to tubing 36, with the open side of the channel facing outward. The position of channels 37 and 38 are such that when the open side of channel 37 is lowered over tubing 5 or 5', the open side of channel 38 may be rotated outward over tubing 6 or 6' while the longer "upper" side of tubing 36 will extend inward from and perpendicular to tubing 5 or 5' towards the center of cart "A".

Steel plates 39 and 40 are identical, but are welded to tubing 36 as mirror images. Each is a rectangular section of steel plate which has a slot cut in one of the narrower ends. A small portion of the slotted end is bent upwards, creating a lip. Steel plates 39 and 40 are welded to tubing 36 on opposite sides of the inward end, with the slotted end facing inward, and at approximately 45 degree downward angles to the axial extent of tubing 36 as best shown in FIG. 8c.

A section of steel plate 41 is welded to the top of and parallel to the inward end of tubing 36. The shape of steel plate 41 is rectangular with the upper corners being rounded down. When the hood is mounted on the cart in the horizontal position, the front of the hood will be resting on steel plate 41. The shape of steel plate 41 affords less contact between the two but at the same time allows for adequate support of the hood.

Attachment 8-B is a front hood support rod which is used in conjunction with attachment 8A to support the hood in a number of raised positions. The attachment 8B is formed of a length of steel rod, 42, which has been machined to a taper at each end and to which a number of equally spaced steel flat washers have been welded. The washers are located near each end where the taper ends and at various points in between. The rod is of a size less than the width of the slot in steel plate 39 and 40 in attachment 8A, while the flat washers are of a size greater than the width of the slot in steel plates 39 and 40. To raise the hood, one of the tapered ends of rod 42 is inserted into any hole in the hood located on the bottom side toward the front end of the hood. The hole must be of a size greater than the tapered end of rod 42, but of a diameter less than the flat washers welded to rod 42 and must have sufficient strength in the material surrounding the hole to support the weight of the hood while it is resting on the flat washer. The front of the hood is raised with attachment 8-B to a height slightly greater than the height required for painting the underside of the hood. The lower end of rod 42 is pivoted into the slot on steel plate 39 or 40, attachment 8-A. Then rod 42 is lowered until the flat washer above steel plate 39 or 40 is resting on the steel plate 39 or 40. The lip on steel plate 39 or 40 prevents the washer on rod 42 from slipping off of the steel plate 39 or 40.

FIG. 8f illustrates attachments 8-C and 8-D which show rear hood hinges that are mirror images of one another and which are used to anchor the rear of the hood as it would be anchored with hinges on the vehicle. The drawing illustrates two mirror image halves, half 43A and half 43B. Each is a section of steel plate which has been formed so that a semi-cylindrical section is located along the center and a flanged section is on each side. The flanged sections have a bore hole centered near each end. Machine bolts and nuts, not shown, are used to couple the two sections through the four bores. When coupled, 43A and 43B have a cylindrical center section of a size slightly greater than the diameter of tubing 32 of attachment 7A which illustrates a rear cross bar.

A section of square steel tubing 44 is cut square on one end and diagonally on the other end. It is welded to the top of half 43A, parallel to the length of half 43A, with the squared end of tubing 44 extending outward from the length of half 43A and with the tapered end of tubing 44 extending more than half way across the length of the attachment. A section of round steel tubing or sleeve 45 is welded to the square end of tubing 44 in a position perpendicular to tubing 44 and with the excess length of tubing 45 extending rearward. A section of steel tubing 46 is of a size slightly less than tubing 45 so that it may slip into tubing 45. A section of steel plate 47 has been bent at a slight angle so that the resulting sections, opposite the bend, are rectangular in shape. A bore is drilled in the center of one of the rectangular sections. Steel plate 47 is welded to tubing 46 in a position so that the section without the bore is on top of and flush with the end of tubing 46 and the section with the bore extends outward and downward from tubing 46. A roll pin through the end of tubing 46 prevents it from slipping out of tubing 45.

Parts 8-C and 8-D are mounted onto the rear crossbar, by slipping parts 43A and 43B over tubing 32 and installing machine bolts and lock nuts through the bores in parts 43A and 43B. They are positioned so that one is on either side of tubing 33 and with the end containing tubing 45 away from tubing 33.

Parts 8-C and 8-D are free to slide back and forth on tubing 32 and to rotate around tubing 32. Tubing 46 is free to rotate within tubing 45 thereby allowing plate 47 to rotate up to 360 degrees. This range of motion allows parts 8-C and 8-D to accommodate any width hood and to be aligned in a position where the hood may be anchored to steel plate 47 with bolts utilizing the hood's hinge holes. In addition, attachment 8A for the front hood support may be positioned at numerous points on side rails 5 or 5' so that hoods with various lengths may be accommodated.

Figure 9:
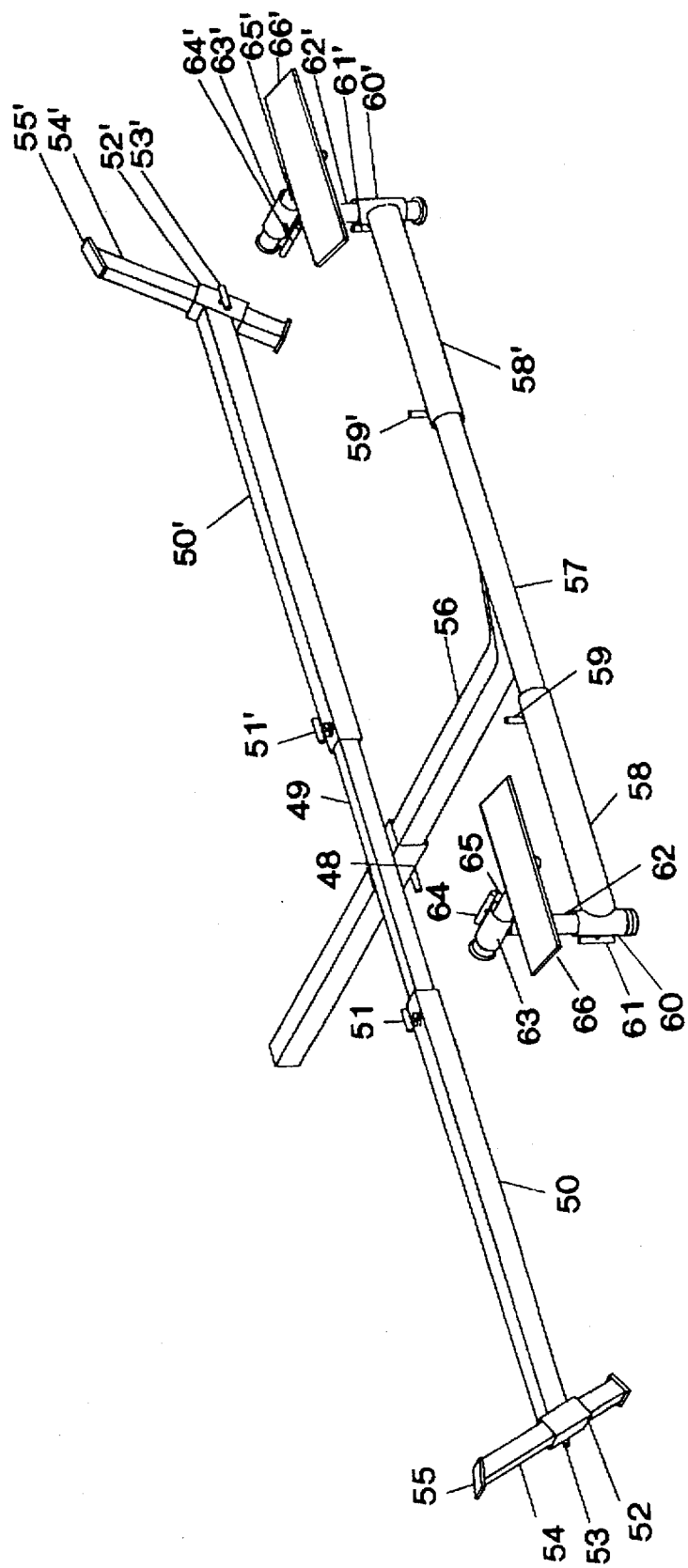
FIG. 9 is a perspective view of the Bumper Support Rack 9A.

Attachment 9-A forms a bumper support rack shown in FIG. 9. The bumper support rack is utilized to mount bumpers of various sizes and shapes. The bumper support rack is a section of square steel tubing 49 which is welded to the top of a square steel tube 48 or sleeve in a position perpendicular to and centered on tube 48. Sections of square steel tubing 50 and 50' are of a size slightly larger than tubing 49 so that tubes 50 and 50' may be slid over tube 49. Tubes 50 and 50' have a threaded bore on their top side, near the end which slides over tube 49, so that thumb screws 51 and 51' may be attached. The outer ends of tubes 50 and 50' are cut at an angle so that the length of the top side is greater than the length of the bottom side.

Sections of square steel tubing or sleeves 52 and 52' are welded to and centered on the angled end of tubes 50 and 50' so that the open ends of tubes 52 and 52' extend upward and downward. Tubes 52 and 52' have a threaded bore centered on their rear side so that thumb screws 53 and 53' may be attached. Sections of square steel tubing 54 and 54' are of a diameter slightly smaller than that of tubes 52 or 52' so that tubes 54 and 54' may be inserted into tubes 52 and 52'. The lower end of tubes 54 and 54' is cut square while the upper end is cut at an angle so that the outside length is greater than the inside length. Sections of steel plates 55 and 55' are welded to and cover the upper end of tubes 54 and 54' so that the excess length of the steel plates 55 and 55' extend outward and upward from tubes 54 and 54'.

A section of square steel tubing 56 has a size slightly smaller than the size of tube or sleeve 48 and also of a size slightly smaller than the size of tubes 33, 34 and 35 of the rear crossbar, so that tube 56 may be slid through tube 48 and into either tubes 33, 34 or 35 depending upon the mounting angle desired. A short section of tube 56, toward the front end, has been bent at an upward angle. A section of round steel tubing 57 is welded to the upward bent end of tube 56 in a position centered on and perpendicular to tube 56. Tubes 58 and 58' are sections of steel tubing of a diameter slightly greater than tube 57 so that tubes 58 and 58' may be slid over tube 57. Tubes 58 and 58' have a threaded bore located to the rear near the end which slides over tubes 57 so that thumb screws 59 and 59' may be attached. Round tubes or sleeves 60 and 60' are sections of steel tubing welded to the ends of tubes 58 and 58' in a position perpendicular to tubes 58 and 58' and with the open ends of tubes 60 and 60' extending upward and downward. Tubes 60 and 60' have a threaded bore, centered towards the rear of tubes 58 and 58', so that thumb screws 61 and 61' may be attached. Tubes 62 and 62' are sections of steel tubing of a diameter slightly smaller than tubes 60 and 60' so that round tubes 62 and 62' may be inserted into tubes 60 and 60'. Tubes or sleeves 63 and 63' are sections of steel tubing welded to the top end of tubes 62 and 62' in a position centered on and perpendicular to tubes 62 and 62'. Tubes 63 and 63' have a threaded bore centered to their inside so that thumb screws 64 and 64' may be attached. Tubes 65 and 65' are sections of steel tubing of a diameter slightly smaller than tubes 63 and 63' so that tubes 65 and 65' may be inserted into tubes 63 and 63'. Rectangular sections of steel plate 66 and 66' are centered and welded at a 15 degree angle to the outward end of tubes 65 and 65' so that the longer sides of the steel plates 66 and 66' are perpendicular to tubes 65 and 65'.

Looking at FIG. 9, it is evident that tubes 58 and 58' can be moved in and out on tube 57 and can also be rotated around tube 57 until locked in place by thumb screws 59 and 59'. Tubes 62 and 62' can be moved up and down and rotated within tube 60 and 60' until locked in place by thumb screws 61 and 61'. Tubes 65 and 65' can be moved in and out and rotated within tubes 63 and 63'. This range of movement allows virtually all sizes of bumpers to be hung from steel plates 66 and 66' allowing steel plates 66 and 66' to rest flat to the underside of the bumper cover, thereby avoiding distortions in the cover during the painting and baking processes.

Square steel tube 48 can be moved forward and backward on tube 56. Square tubes 50 and 50' can be moved in and out on square tube 49. Square tubes 54 and 54' can be moved up and down within square tubes 52 and 52'. This range of movement allows virtually all sizes of wrap-around bumpers to be hung in a stable position. Roll pins inserted after assembly keep tubes 54, 54', 62, 62', 65, and 65' from becoming disassembled during use.

Figure 10:
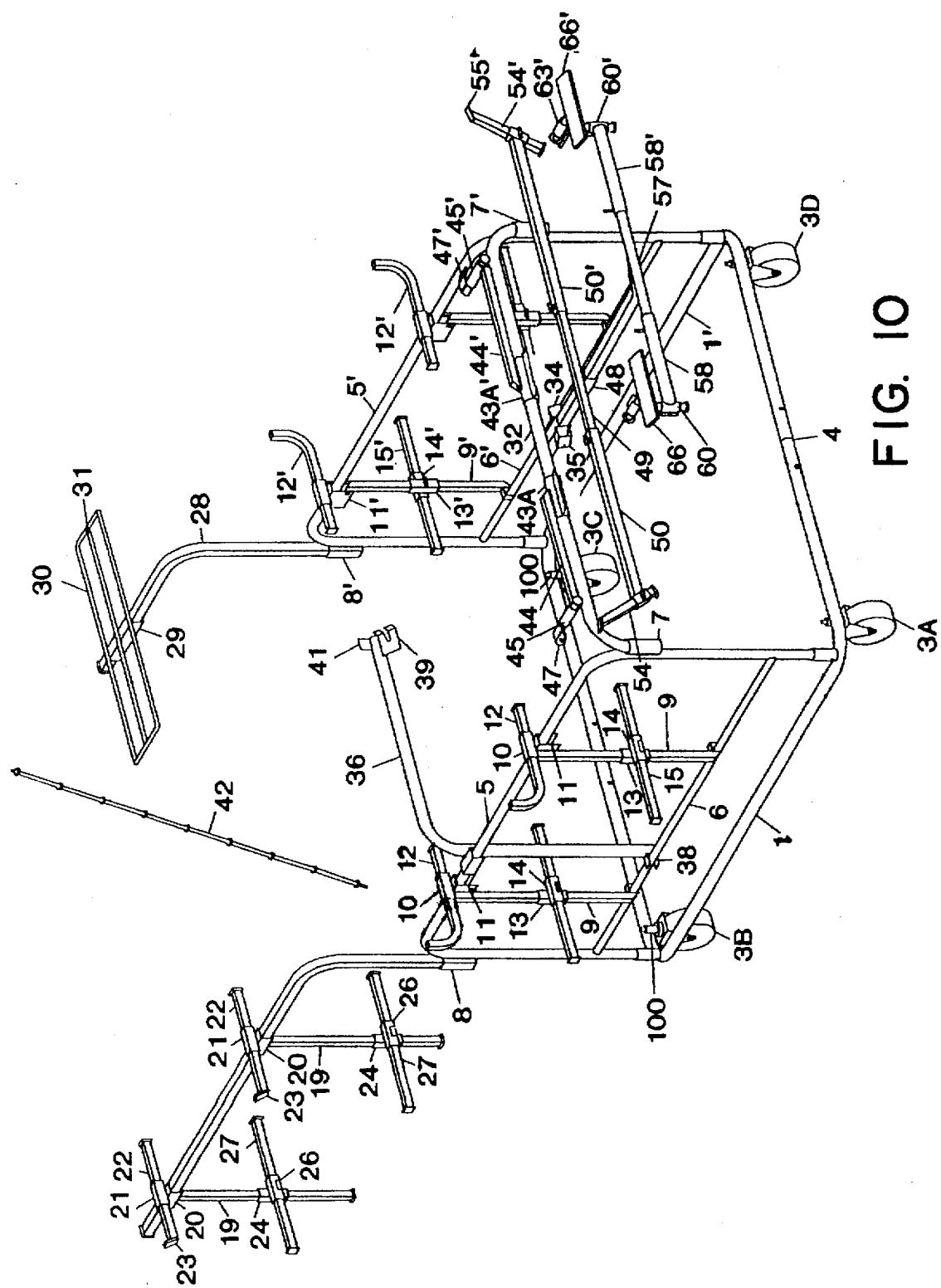
FIG. 10 is a perspective view of the fully assembled Paint Cart "A" with all attachments mounted.

FIG. 10 shows the paint cart "A" with all of the attachments mounted in place. The rear end of the cart has been designed as an "open" end so that the painter is able to move within the cart to paint all inner and under sides of the mounted panels not paintable from outside the cart.

Figure 11:
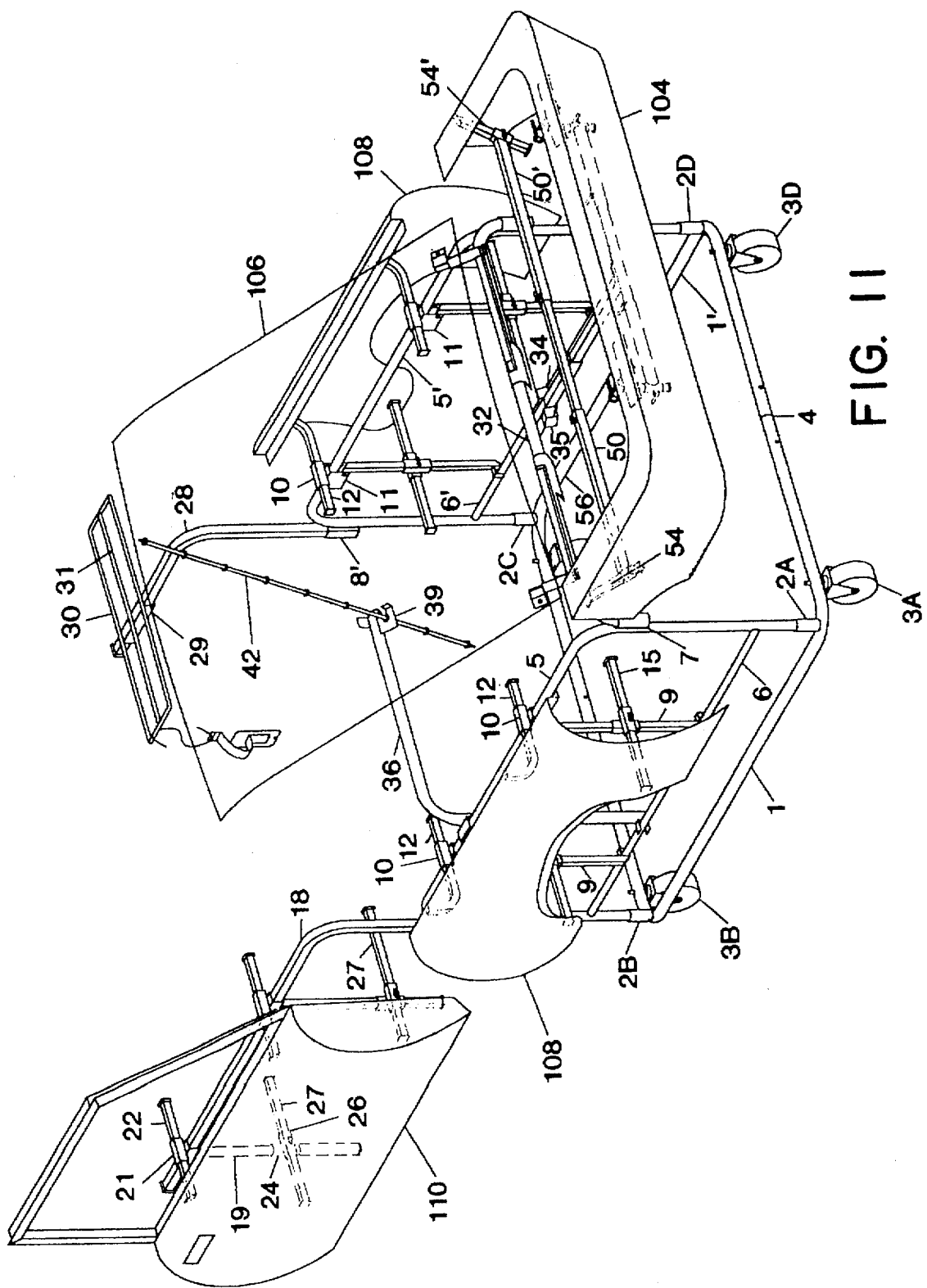
FIG. 11 is a perspective view of the Paint Cart "A" shown in FIG. 10 with all attachments mounted and showing various body panels illustrated in their proper position for painting on the cart.

FIG. 11 shows the paint cart "A" with all of the attachments mounted in place and with various body panels hung from the attachments. The cart is designed to accommodate one bumper 104, one hood 106, a combination of 3 fenders 108 and/or doors and smaller miscellaneous body parts. The cart is designed to be stable so that body panels may be hung in the order deemed most appropriate by the painter without worry of tipping the cart. The entire unit, fully loaded, can be moved effortlessly by one person.

The foregoing relates to preferred exemplary embodiments of the invention, it being understood that other variants and embodiments thereof are possible within the spirit and scope of the invention, the latter being defined by the appended claims.

What is claimed:

1. A rack for supporting vehicle body parts during painting which comprises a rectangular base, first vertical support means secured at each corner of said base, oppositely disposed side rails supported by said first vertical support means, each of said side rails including second and third supports (7, 7') along a rear side thereof, a rear end rail supported by a second vertical support means on a rear side of each of said end rails, a first attachment secured to said rear end rail for supporting a bumper, a second attachment supported by said rear end rail for securing an end of a hood, a pair of third attachments secured to each of said side rails for supporting a fender on each side rail, a first L-shaped arm supported by one of a third vertical support means on a front side of said side rails, attachment means secured onto said first L-shaped arm for supporting a door, a second L-shaped arm supported by another of said third vertical support means on a front side of said side rails, attachment means secured onto said second L-shaped arm on which miscellaneous parts are supported, and a third L-shaped arm which is supported by one of said side rails which is provided with means for supporting one end of a hood of a vehicle.

2. A rack as set forth in claim 1, in which said base is formed by two U-shaped tubular sections which are secured together by a tube which slides into each end of each tubular section.

3. A rack as set forth by claim 2, in which each of said side rails are formed by U-shaped tubular material, and a rod is secured between the U-shaped portions.

4. A rack as set forth by claim 3, wherein said second vertical support means on a rear side of said U-shaped said rails are round tubular pieces.

5. A rack as set forth in claim 3, wherein said third vertical support means on a front side of said side rails are rectangular tubes, and said first and second L-shaped arms are rectangular tubes in which one end fits into one of said third vertical support means.

6. A rack as set forth in claim 1, in which said attachment for supporting said bumper includes a first elongated square tubing element (56) having one end that is bent upwardly, a round tubing element (57) is welded to the bent end of said first square tubing element (56) perpendicular thereto, an adjustable fitting is secured to each end of the round tubing element, a second square tubing element (49) is welded to a third square tubular element (48) perpendicular thereto, said first square tubing element (56) fits into the third square tubular element (48), and the second square tubing element (49) is provided with oppositely disposed adjustable tubular extension portions (50, 50') each of which include an adjustable end piece (54, 54'), and said first elongated square tubing element (56) is adjustably supported by a holder (34, 35) on said rear end rail.

7. A rack as set forth in claim 1, in which each of said attachments for supporting a fender includes a linear square tubing element (9), a first square tubular sleeve (10) secured to an upper end of said linear square tubing element, a U-shaped clip (11) secured below said first tubular sleeve and to said linear tubing element (9), a J-shaped square tubing element (12) that slips through said first square tubular sleeve, said J-shaped tubing element (12) having an upwardly curved outer end, a second square tubular sleeve (13) that fits over said linear square tubing element (9) and is adjustable relative thereto, a third tubular sleeve (14) that is secured to said second sleeve perpendicular thereto, a straight tubular piece (15) that fits through said third tubular sleeve, means for securing said second sleeve relative to said linear square tubing element (9), and means for securing said straight tubular piece (15) relative to said third tubular sleeve.

8. A rack as set forth in claim 1, wherein each of said attachments for supporting a door includes an elongated piece of square steel tubing (19), a first square sleeve (20) secured to an upper end of said square steel tubing (19) perpendicular there, a second square sleeve secured on an upper surface of said first sleeve perpendicular thereto, a second straight piece of square tubing (22) that slides into said second sleeve, said second straight piece of square tubing (22) having a plate (23) secured to one end thereof with said plate having an end that protrudes above said second straight square piece of tubing (22), a third square tubular sleeve (24) which fits over an end of said elongated piece of square steel tubing (19), a fourth square tubular sleeve (26) that is perpendicular to said third square sleeve and secured thereto, a third square piece of tubing (27) that fits into said fourth square tubular sleeve, means for adjustably securing said third sleeve relative to said elongated piece of square steel tubing (19), and means for adjustably securing said third square tubular steel tubing (27) relative to said fourth sleeve (26).

9. A rack as set forth in claim 1, in which said hood attachment includes an L-shaped steel tubing element (36) having first and second leg portions, to which is provided a perpendicularly disposed U-shaped channel element (37), the U-shaped opening of which is oriented downwardly and its position is near a bend where the two legs join to form the L-shape, a second U-shaped channel (38) is provided near the bottom end of said first leg portion and an opening of which is oriented in a horizontal direction, and slotted end pieces (39 and 41) are disposed on an outer end of the second leg portion.

10. A rack as set forth in claim 9, which includes a linear rod (42) with spaced fixed washers thereon, the rod having a diameter sized to fit into one slot of said slotted end pieces (39 and 41), and said first leg portion of said L-shaped steel tubing being fitted onto one of said side rails and said linear rod being fitted into a slot in one of said slotted end pieces to support one end of a hood in place.

11. A rack as set forth in claim 1, in which said bumper attachment, said hood attachment, said fender attachments, said door attachment and said miscellaneous attachments are adjustable for differently sized vehicle body parts.

12. A rack as claimed in claim 1, in which said base is provided with roller casters so that said rack can be easily moved.

* * * * *